Figure 6:

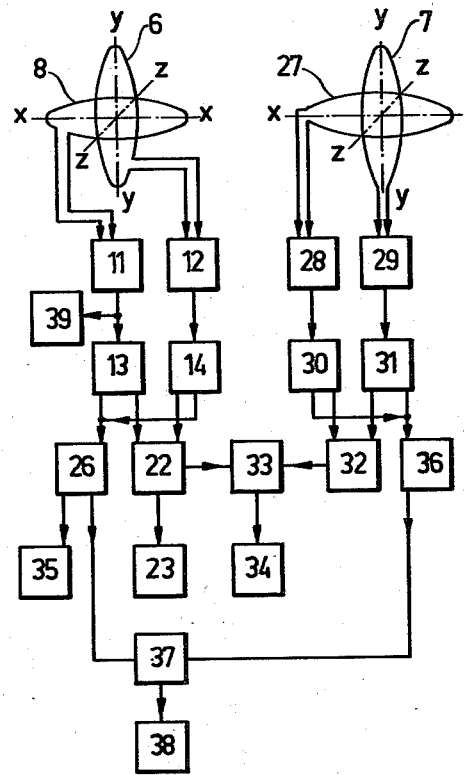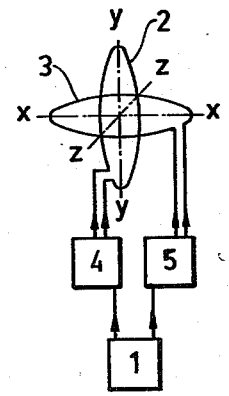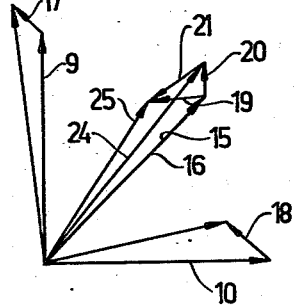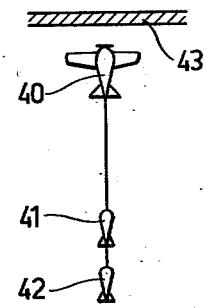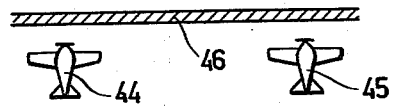

June 4, 1957 E. H. L. HEDSTROM ET AL 2,794,949
ELECTROMAGNETIC INDUCTION METHOD AND
APPARATUS FOR PROSPECTING
Filed May 10, 1955 2 Sheets-Sheet 2

Inventors
Erik Helmer Laurentius Hedstrom
Ruben Valdemar Ingholm
By Leech and Radue
Attorneys

United States Patent Office 2,794,949
Patented June 4, 1957

2,794,949

ELECTROMAGNETIC INDUCTION METHOD AND APPARATUS FOR PROSPECTING

Erik Helmer Laurentius Hedstrom, Stockholm, and Ruben Valdemar Tegholm, Johanneshov, Sweden Application May 10, 1955, Serial No. 507,362

Claims priority, application Sweden February 3, 1955

22 Claims. (Cl. 324—6)

The present invention relates to an improved electromagnetic induction method and apparatus for prospecting, i. e. detecting and exploring, mineral ores and other geological formations, subterranean metal bodies and the like.

A great variety of different electromagnetic induction prospecting methods have been depicted in the past, according to which an audio frequency alternating electromagnetic field, primary field, is set up by means of a transmitting system or unit comprising a solenoid passing an alternating current flow, or a cable loop suspended above or disposed on the ground and passed by a flow of alternating current, or a straight cable placed on the ground and grounded at both ends and passed by an alternating current flow. The lines of force of the primary field then penetrate into the rock and give rise to eddy currents in any electrical conductors buried therein, such as, for instance, certain mineral ore bodies, which are penetrated thereby. The magnetic alternating field produced by such eddy currents, the secondary field, has the same frequency as the primary field, but may be more or less out of phase relative to the latter. The secondary field, or fields, will cause local disturbances of the primary field which can be detected and measured enabling conducting bodies present in the rock to be localized. For the detection of so-called anomalies in, for instance, the real (in-phase) and/or the imaginary (out-of-phase) component of the field the so-called compensation method is often employed, acording to which the voltage induced by the total field, viz. the primary and secondary fields in common, in a solenoid or so-called receiving coil, is compared with a reference voltage transmitted by cable from the transmitter. If in the transmitting system a solenoid as hereinbefore referred to, a so-called transmitting coil, is used, then the amplitude of the primary field will decrease as the third power of the distance from the transmitting coil. For accurate measurements it is extremely important, of course, that the mutual orientation of, and distance between, the transmitting coil and the receiving coil be determined with great accuracy since, for example, even a one percent error in the distance will involve a 3 percent error in the amplitude of the field being measured. This condition is true, of course, both when the transmitting coil and the receiving coil are moved simultaneously along a ground profile to be measured, in which case the maintenance of a constant distance between these coils is aimed at, and when, for making detailed measurements, the transmitting coil is kept stationary whilst progressively changing the distance of the receiving coil therefrom. In respect of those methods which have been proposed for carrying out electromagnetic induction prospecting from aircraft, the conditions just described have involved great difficulty since the mutual changes in orientation and distance will then be relatively great, for instance between an airborne transmitting coil and a receiving coil towed behind the aircraft. (A system having fixedly interlocated transmitting and receiving coils is impossible to use in this case because the distance between the coils will then be too small as compared to the necessary altitude of flight, whereby conducting bodies present in the rock will no longer reveal their presence.) It has been proposed in order to overcome these difficulties, inter alia, to use simultaneously a system of a plurality of transmitting coils disposed close to each other and rigidly interconnected and adapted to transmit a plurality of primary fields of different frequencies, and a corresponding system of a plurality of receiving coils disposed close to each other and rigidly interconnected, the voltage induced in each one of the receiving coils being recorded in respect of one only of said frequencies, respectively (separation filter). While this enables distance changes to be compensated for, still the errors resulting from changes in the relative orientation of the transmitting and receiving coils will substantially remain. In order to make up for this condition the incorporation of very complicated arrangements involving "correction coils," follow-up control of the transmitting and receiving coils, and even continuous rocking of a receiving coil to repeatedly occupy a position in which the primary field induces zero-voltage in the coil, have been proposed in the past.

The present invention has for its object to provide a simplified and improved method for electromagnetic induction prospecting whereby the difficulties just referred to owing to uncontrollable variations in respect of the mutual distance and orientation between the transmitting and receiving coils will be overcome, such difficulties arising particularly with airborne prospecting equipment.

The method according to the invention is primarily characterised in that a magnetic rotary field is transmitted by means of a transmitting unit and in that, by means of at least one receiving unit moved over the area of exploration, anomalies produced in the magnetic rotary field within this region of exploration are measured and/or recorded. The measuring and/or recording of anomalies can be performed in the course of the movement of the receiving unit over the area of exploration. This movement can be carried out along a profile of exploration in a magnetic rotary field produced by a stationary transmitter while progressively or continuously changing the distance between the transmitter and the receiver or receivers. The measuring and/or recording of anomalies in the magnetic rotary field may be carried out also while both the transmitter and the receiver or receivers, while maintaining substantially unchanged the distance between them, are being moved along a profile of exploration with transmitter and receiver in a tandem arrangement, the transmitter and receiver or receivers being then moved by, for instance, human carriers or cross-country vehicles, water craft or air craft.

According to another realization of the method of the invention the measuring and/or recording is carried out while moving the transmitter over the region of exploration in one direction of movement, and simultaneously moving the receiver or receivers in a second direction which is substantially parallel with said first-mentioned direction and in such a manner that the transmitter and the receiver are maintained substantially aligned in side-by-side interrelation. In the course of the measuring and/or recording operation, according to the invention, an axis of the transmitter, along the extension of which axis the magnetic rotary field transmitted by the transmitter is circularly polarized, is maintained directed towards the receiver or receivers.

In a modified method according to the present invention use is made of either a magnetic rotary field as above, or of a magnetic alternating field set up by a stationary or continuously moving transmitting unit, and the mainly characterising feature of this modification resides in that, by means of at least two receiving devices which are not electrically interconnected with the transmitting unit and which are continuously moved over the region of exploration by land, water or air craft, the gradients over the space between said two receiving devices, of anomalies set up in said magnetic alternating field in the region of exploration, are continuously measured and/or recorded. The utilization, for such exploration, of the gradients over the space between two receiving coils of anomalies set up will render unnecessary the use of a reference voltage from the transmitting unit so that there will be no need for a transmitting cable interconnection between the transmitting unit and the receiving unit, and, in addition, such difficulties as are involved in uncontrollable variations in distance and orientation between transmitting and receiving coils will be obviated.

The invention enables the measurement and/or recording of the following quantities, among others:

(1) An unbalance voltage obtained from a receiver as the polarization of the field changes from circular into elliptic.

(2) The rate-of-change with time of an unbalance voltage from a receiver.

(3) The phase angle between two voltages in a receiver.

(4) The rate-of-change with time of the phase angle between two voltages in a receiver.

(5) The differential voltage between two unbalance voltages obtained from two receivers.

(6) The rate-of-change with time of a differential voltage between two unbalance voltages from two receivers.

(7) The phase angle differences between two receivers (the gradient of the phase angle over the range between the receivers).

(8) The rate-of-change with time of the phase angle difference between two receivers.

A preferred apparatus for carrying into effect the method according to the invention is mainly characterised thereby that the transmitting equipment is arranged to set up a magnetic rotary field, and in that the receiving equipment is arranged to measure and/or record anomalies in a magnetic rotary field. The receiver or receivers may be arranged, without being electrically interconnected with the transmitter, to measure and/or record anomalies in the magnetic rotary field produced by the transmitter. The transmitting equipment may comprise a magnetic dipole arranged to be rotated about an axis at right angles to the magnetic axis of the dipole. According to a further embodiment the transmitting unit may comprise two coils (solenoids) disposed at right angles to one another and being connected through current controlling and phase shifting means to an oscillator or generator in such a manner as to cause the currents in the coils to be 90° out of phase with each other, and to cause the product of ampere-turns by area to be equal for the two coils, or to cause the product of a ampere-turns by area in respect of one coil to be double this product in respect of the other coil. The receiver or receivers suitably comprise two coils (solenoids) mounted at right angles to one another and connected to phase shifting netwworks enabling voltages induced in the coils by a circularly polarized field to be phase shifted so as to permit equalization of the voltages one against the other.

Other objects and advantages of the present invention will be set forth or become apparent from the following description taken in conjunction with the accompanying drawings in which:

Figs. 1 and 2 are together a block diagrammatic representation of an apparatus for carrying into effect the method according to the invention, Fig. 1 illustrating two receiving devices and their circuit interconnections, and Fig. 2 illustrating a transmitter.

Figure 7:
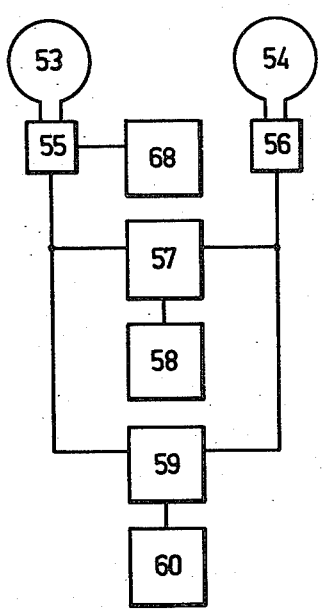
Figure 8:
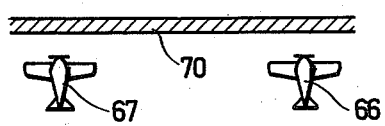
Figure 9:
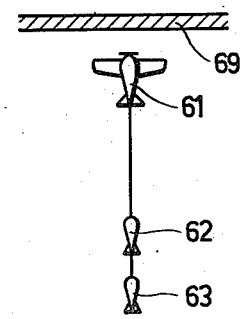

Fig. 3 is a vector diagram showing the relative voltages induced in one receiving device, Fig. 4 is a diagrammatic top-plan view of an aircraft towing behind it two streamlined casings or "bombs" containing receiving devices, Fig. 5 is a diagrammatic top-plan view of two aircraft one of which carries a transmitter whilst the other carries one or more receivers or pick-up devices, Figs. 6 and 7 together form a block diagrammatic representation of preferred apparatus for carrying into effect the modified method according to the invention, Fig. 6 illustrating a transmitting unit, and Fig. 7 illustrating a receiving unit comprising two receiving devices and their interconnecting circuit arrangements, Fig. 8 is a diagrammatic top-plan view of two aircraft one of which carries a transmitting unit whilst the other carries two receiving devices; and Fig. 9 is a top-plan view of an aircraft towing behind it two streamlined casings or "bombs" containing receiving devices.

Referring now to the drawings more specifically, in Fig. 2 numeral 1 designates an oscillator which supplies alternating current, for instance at a frequency of 1,000 C. P. S., to a vertically disposed transmitter coil 2 and to a horizontally disposed transmitter coil 3 perpendicular to the former coil, these coils being practically identical. The axis Y—Y of the coil 2 is perpendicular to the axis X—X of the coil 3; and these two axes are each perpendicular to the line of intersection Z—Z of the two coils. By 4 and 5 phase shifting networks are designated adapted to phase shift the current in such a manner as to cause the currents in the two coils to be 90° out of phase with one another. This will produce a magnetic rotary field the axis of rotation of which will be the line of intersection between the planes of the two coils 3. It is apparent that if the current intensity is equal in the two coils, then the magnetic field at any point along the axis just mentioned, i. e. the axis Z—Z in Fig. 2, will be circularly polarized, i. e. it will be of equal strength in all directions perpendicularly to the Z-axis, as seen from any one point along the axis. On the other hand, at each point along the X-axis of Fig. 2 the magnetic field will be elliptically polarized in such a manner that its horizontal vector (field component from transmitter coil 2) is twice its vertical vector (field component from transmitter coil 3). If the current intensity in the vertical coil 2 is made to be half that in the horizontal coil 3, then the field will be circularly polarized at each point along the X-axis, i. e. it will be of equal strength in all directions in the plane containing the X- and Y-axes.

In the two receiving devices illustrated in Fig. 1, the two identical receiving coils contained in each device are disposed at right angles to each other and are oriented analogously with the transmitter coils illustrated in Fig. 2, so that the vertical coils 6 and 7 of the two receiving devices have their center axes (X-axes) pointing towards the transmitting device, the X-axis of which is directed towards the receiving devices.

The voltages induced by a circularly polarized field in, for instance, the receiving coils 6 and 8 are equal in magnitude and 90° out of phase relative to one another, which is illustrated in the vector diagram of Fig. 3 in which 9 designates the voltage induced in the vertical coil 6, and 10 designates the voltage induced in the horizontal coil 8. If a receiving device, such as 6, 8, is rotated about a horizontal axis perpendicular to the plane X—Y, that is, about the Z-axis, there will be no change in the phase or amplitude values of the voltages induced in the receiving device since, as will be recollected, the field is circularly polarized. Angular displacement of the receiving device about the horizontal axis (X-axis) pointing towards the transmitting device, or about a vertical axis (Y-axis) will only reduce the amplitude value of the voltage in the horizontal coil 8, or the vertical coil 6, by the cosine of the angle of displacement, whereas the phase angle of the voltage will be unchanged. The outputs obtained from the receiving coils 8 and 6 are amplified in two identically devised amplifiers 11 and 12, after which the voltages are subjected to phase shift in corresponding phase shifting networks 13 and 14 so as to be in phase with one another. The unbalance voltage between these two voltages will be approximately zero and is determined by the degree of circuit noise, cross feed, etc. In Fig. 3, numerals 15 and 16 are the vectors representing those voltages which are obtained after the amplification and phase shifting operations.

When the arrangement is moved over an electrically conducting geological formation or any other conducting body on or below the ground surface, a secondary field will be produced which will induce, in a definite moment, a voltage 17 in the vertical coil 6 and a voltage 18 in the horizontal coil 8. These voltages are either in phase, or they are 180° out of phase with each other, depending on the direction of the secondary field. These voltages will be amplified in the amplifiers 12 and 11 and phase shifted in the phase shifting networks 14 and 13, respectively, which has been represented in the vector diagram in which numeral 19 designates the phase shifted voltage from the horizontal coil and numeral 20 designates the corresponding voltage from the vertical coil. The unbalance voltage thereby obtained corresponds to the vector 21. The amplitude value of this unbalance voltage is continuously measured or recorded by an automatic recorder 22. The sensitivity of this recorder is suitably so chosen as to cause the same directly to record the value of the unbalance voltage, for instance in percent of the output voltage from the coils obtained when no electrically conducting geological formations are present in the neighborhood.

The amplitude of the unbalance voltage 21, on moving past an ore body, will change at a relatively rapid rate. In a second automatic recorder 23 the rate-of-change with time of the unbalance voltage is recorded. A great advantage will be involved in this recording since the constant noise level, which cannot be eliminated completely, will not be recorded. In addition, slow changes in the relative positions of the transmitting and receiving coils will not appreciably affect the result of the measurement.

As mentioned hereinbefore, the voltages 15, 16 from the two coils 6 and 8 will be in phase with each other after the phase shifting operation, irrespective of the direction of this receiving device, since in the manner disclosed the transmitting device is directed towards the receiving devices. On occurrence of a secondary field the voltages 24 and 25 obtained after the amplification and phase shifting operations will be out of phase from each other. In Fig. 1 numeral 26 designates a well-known type of measuring and recording device which only measures or records the phase angle between the two voltages 24 and 25, Fig. 3. A record from this device 26, therefore, will only be obtained when the receiving equipment is passing an electrically conducting geological formation (such as an ore body) which will set up a secondary field.

The phase angle between the voltages 24 and 25, on passing an ore body, will be subjected to a relatively rapid rate of change. An automatic recorder 35 connected to the measuring and recording device 26 is adapted to record the rate-of-change with time of the phase angle. In this connection the same advantages will result as those above referred to in connection with the recording of the rate-of-change with time of the unbalance voltage, namely that the constant noise level will not be recorded, and that slow changes in the relative positions of the transmitting coil and the receiving coils will not appreciably affect the result of the measurement.

The receiving device comprising the vertical coil 7 and the horizontal coils 27 is built up in the same manner as the receiving device 6, 8 just described. The spacing of these two receiving devices is relatively short, being for instance 80 feet, as compared to their spacing from the transmitter, for instance 650 feet. The amplifiers 28 and 29 and the phase shifting networks 30 and 31 are also devised identically with the corresponding elements 11, 12 and 13, 14, respectively. A device 32 corresponding to the recorder 22 furnishes an unbalance voltage which need not, however, be recorded. In a suitable recorder 33 the differential voltage resulting from the two unbalance voltages from 22 and 32, that is, ultimately from the two receiving devices, is branched off and recorded. Incidentally, this recording obviously will be independent of the directional orientation of the transmitting device relative to the receiving devices, assuming, as stated hereinbefore, the spacing therefrom to be large as compared to the spacing between the receiving devices themselves. A suitable conventional recording device 34 records the rate-of-change with time of the differential voltage recorded by the recorder 33. This recording will again, as in the case of the receiving device 6, 8 previously described, be independent of the constant noise level as well as of slow changes in the relative positions of the coils.

Connected to the phase shifting networks 30 and 31 is a suitable conventional measuring and recording device 36 corresponding to the device 26 and adapted, in the same way as the latter, only to measure or record the phase angle between the two output voltages from the networks 30 and 31. These two devices 26 and 36 are separately connected to a device 37 of any conventional type adapted to measure and/or record the difference between the phase angles obtained in the two receiving devices and as measured by the two devices 26 and 36, or, in other words, the gradient of the phase angle over the space between the two receiving devices. This measuring and/or recording device 37 is connected to a suitable conventional measuring and/or recording instrument 38 adapted to indicate the rate-of-change with time of said phase angle difference, that is, the phase angle gradient.

Numeral 39 designates an indicating unit which is associated with the coil 8, preferably at the output of the amplifier 11, and which is arranged to operate in response to the amplitude of the voltage induced in that coil of the receiving system. Since the amplitude of said induced voltage varies inversely as the third power of the spacing of the receiving device from the transmitting system, this indicating unit will constitute a suitable means of determining the range between the receiving and transmitting systems for a purpose to be explained further below.

It is to be noted that the components of the equipment as described are purely conventional in nature, and, therefore, the choice of the various elements in any actual case would be obvious to anyone skilled in the art, so that such components or elements need not be specifically described in detail. The amplifiers, in order to obtain a low noise level, should be tuned to the transmitter frequency. The phase shifting networks may take any one of several forms, for instance including resistors and capacitors. The units serving for obtaining the rate-of-change with time of the voltage functions could consist, for example, of a suitable combination of resistors and capacitors in a manner obvious to anyone skilled in the art. The recording units could be of the type writing directly on a paper tape, photographically recording oscillographs, etc. The transmitting systems is operated by an oscillator the frequency of which is stabilized. Where only one frequency is employed for the two transmitting coils there is no need for an accurate stabilization of voltages, etc.

It would not be necessary, of course, simultaneously to perform all the recording operations as described hereinbefore. The number of records should, of course, be adapted in relation to the character of the actual purpose, to the desired accuracy of measurement, etc.

In the embodiment described hereinbefore by way of example the X-axis of the transmitting unit is oriented towards the receiving devices. If instead the Z-axis of the transmitting unit be oriented towards the receiving devices, then the current intensity should be equal in the two transmitting coils, and the receiving devices should, as closely as feasible, be maintained oriented in such a way that their Z-axes are directed towards the transmitter. The amplification of the feeble output voltages from the coils should be accomplished as close to the receiving coils as possible since, as is well known, this will minimize the noise level due to cross-feed.

The transmitting unit and the two receiving devices may be moved over the surface of the ground in any one of several ways. Thus, for example, the transmitter may be mounted in an airplane 40, Fig. 4, towing on a wire behind it one or two streamlined casings or "bombs" 41 and 42 which contain the coils and amplifiers, these elements being through a cable interconnected with the other components of the receiving systems, being housed in the airplane. The plane would suitably be flown substantially orthogonally to the geological strike, that is, to the expected extension of a mineral ore body 43. The recording of the measurements, as well as certain checks and adjustments, are carried out in the airplane.

The transmitting system may also be mounted in an aircraft towing behind it a glider in which one or more receiving devices are installed. In this case the recording is accomplished in a simple way in the glider, since no direct interconnection between the transmitting and receiving systems is necessary in the case of the novel equipment described. It would also be possible, in the manner just indicated, to install the measuring systems in two aircraft which are mechanically independent of each other altogether and of which one is flown behind the other while maintaining a substantially constant predetermined distance relative thereto. The distance to be maintained between the two air craft, however, is not critical. In this case, as in the previous one, one of the two air craft could tow behind it on a comparatively short wire "bombs" containing the receiving devices so as to cause the latter to be moved as close to the ground surface as possible thereby to increase their sensitivity.

The transmitting and receiving units could also be disposed in, or be towed behind, two separate air craft 44 and 45, as illustrated in Fig. 5, these air craft being then flown in line-formation, side by side, in which case one air craft is flown at a predetermined comparatively short distance at the right or left of the other air craft. In order to facilitate the pilots maintaining parallel the headings of their planes—and thus to keep as constant as possible the spacing of the transmitting and receiving systems—it is recommended to employ the range indicating unit 39 as hereinbefore described. The transmitting system could be installed, for example, in the airplane at the left, 44, having equal current intensities in its two coils, and having the axis of rotation of its magnetic rotary field oriented manually towards the other airplane 45, in which latter the receiving devices are installed in such a way that they will be oriented in space in a manner similar to that of the transmitting coils. When the two air craft are moving orthogonally to the direction of extension of a geological formation consisting of, for example, an electrically conducting mineral ore body 46, the secondary fields set up, and especially the rate-of-change with time of the secondary fields and of the gradients thereof, will be more pronounced than in the case where the receiving devices were towed or flown behind the transmitting system. It is also possible in this arrangement to have a transmitting unit as referred to above installed in each one of the air craft, and having the associated receiving unit installed in the other air craft, in which case one transmitting unit would operate at a relatively low frequency (for example 440 C. P. S.), and the other would operate at a relatively higher frequency (for example 1,760 C. P. S.). This arrangement enables the attainment of more favorable results so that it would be possible even on the first reconnaissance flight over a region, to distinguish between secondary fields as set up by conducting geological formations possessing a high or less high or low electric conductivity. When using two planes flown in side-by-side, i. e. parallel, relation according to this method, in the first investigation sweep a comparatively wide strip of the region of exploration along the profile of flight will be covered, corresponding approximately to the spacing of the two air craft, whereas in the case of towing or flying the receiving unit behind the transmitting unit, a strip will only be covered having a width of the order of magnitude of the cruising altitude (which latter, in its turn, is largely restricted).

Referring now more particularly to Figs. 6 and 7, the transmitting unit of Fig. 6 comprises an oscillator or generator 51 adapted to supply alternating current (at a frequency of, for example, 1,000 C. P. S.) to a transmitting coil 52 so as to cause the latter to set up a primary field. The voltages induced in the two receiving coils 53 and 54 of the receiving unit, Fig. 7, by the primary and secondary fields, respectively, are amplified by the two amplifiers 55 and 56. The output voltages of the coils 53 and 54 will be in phase with each other as long as the coils are energized exclusively by the primary field set up by the transmitting coil 52, and independently of the mutual orientation of the coils. When moving over an electrically conducting geological formation a secondary field will be set up which causes a phase shift to take place between the voltages induced in the two receiving coils. In Fig. 7, numeral 57 designates a suitable conventional measuring and recording device of the type adapted to measure or record only the phase difference between the two output voltages obtained from the two receiving devices. Thus, a record or indication from this device will only be obtained when the receiving unit is moving past an electrically conducting geological formation (for instance a mineral ore body). Since the recording device 57 is of the well-known type adapted for direct measuring or recording of phase shift, it will indicate directly the gradient of the phase shift over the space between the two receiving coils.

On moving the receiving unit over the surface of the ground at a high velocity, the phase shift between the output voltages of the receiving coils when moving through a secondary field will change at a relatively high rate. A second automatic recorder 58 is adapted to record the rate-of-change with time of the phase difference between the two voltages induced in the coils. A great advantage is involved in this recording, since the constant noise level, which cannot be completely eliminated, will not be recorded.

A third recording instrument 59 is adapted to record the differential voltage or the ratio (quotient) between the voltages induced in the two receiving coils. This record will indicate the gradient of the magnetic alternating field over the space between the two receiving coils. In this case the recording will not be appreciably dependent on variations in the distances between the transmitting unit and the two receiving devices. If these distances should increase from, for example, 660 and 740 feet, respectively, to 685 and 765 feet, respectively, this would involve a change between the voltages of the two coils of only 1.25 percent, whereas the voltage change suffered by each receiving coil due to the distance change will be about 10 times this percentage.

A further recorder 60 is adapted to record the rate-of-change with time of the gradient obtained from the recorder 59. As pointed out in the preceding case, the recording of a rate-of-change with time will not be affected by the constant noise level, nor by slow variations in the relative positions of the coils.

In analogy with what we have pointed out above the components of the equipment as described, such as coils, amplifiers and recorders, are purely conventional in nature and, therefore, the choice of the various elements in any actual case would be obvious to anyone skilled in the art, so that such components or elements need not be specifically described in detail. The amplifiers, in order to obtain a low noise level, should be tuned to the transmitter frequency. The automatic recorder for the phase shift is of any suitable conventional construction. It could also consist of, for instance, a recorder for automatically recording a D. C. voltage variation, in which case it would be associated with the amplifiers through any conventional device adapted to supply a direct current voltage which is proportional to the phase shift between the two output voltages obtained from the receiving coils. Such arrangements have been disclosed in the special literature on the subject. The further recording instruments are also of any suitable conventional types, and they could be employed also, inter alia, for the quotient recording referred to. The apparatus necessary for recording derivatives of the above-mentioned changes in phase shift and differential voltage could consist, for instance, of a resistor and a capacitor connected in the conventional manner, as is well known to anyone skilled in the art.

The transmitting unit and the receiving unit comprising the two receiving devices may be moved over the surface of the ground in any one of several ways. The transmitting unit may be mounted in an aircraft 61, Fig. 9, towing on a wire two streamlined casings, or "bombs," 62 and 63 containing receiving coils and amplifiers which are connected through an electrical cable with the remaining components which are carried by the aircraft. The distance between the receiving coils (about 80 feet) is relatively short as compared to their distance from the transmitting unit (about 660 feet). The measurements or records may be performed either with horizontally or with vertically disposed coils, in the latter case oriented at right angles to the flight direction. The direction of flight is suitably substantially perpendicular to the direction of strike 69 of the geological formation investigated.

The transmitting unit may also be installed in an aircraft towing behind it a glider in which two or more receiving devices are installed. In this case the recording is readily carried out in the glider since no direct interconnection of transmitting and receiving units is necessary in the arrangement described hereinbefore. It will also be possible, in the manner just described, to install the measuring equipment in two aircraft altogether separate from each other and of which one is flown at a predetermined constant distance behind the other. The distance between the two aircraft will not be critical. In this case, as in the preceding one, one of the two aircraft could, of course, tow behind it on a relatively short wire "bombs" containing the receiving devices, to cause the latter to move as close as possible to the surface of the ground, whereby their sensitivity will be increased.

It has been found by measurements that the resulting secondary fields, and especially the rate-of-change with time of the secondary fields and the gradients thereof, will be considerably increased if the receiving devices, spaced shortly one behind the other and aligned in side-by-side relation to the transmitting unit, be moved perpendicularly to the direction of the geological strike 70, Fig. 8, as compared to the case when the receiving devices are towed behind the transmitting unit, as previously proposed. In this realization of the invention the transmitting unit may be installed in, or towed behind, the aircraft 66, Fig. 8, whilst the receiving devices may be arranged in tandem in, or towed by, the other aircraft 67. The voltages induced in the receiving devices will vary in magnitude as the third power of the distance between the two aircraft. The output voltage obtained from one of the coils, for example coil 53, Fig. 7, after amplification in the amplifier 55, will actuate an indicating instrument 68, which may be a conventional voltmeter, indicating bulbs, etc. Guided by this indicating instrument the pilot of aircraft 67 will be able to maintain the distance from the aircraft 66 within very narrow limits since, as mentioned hereinbefore, the voltage induced in the receiving coil varies with the third power of the distance from the transmitting unit so that a relatively small change in this distance will result in a comparatively large deviation of the indicating instrument.

When using two planes flown in side-by-side relation, according to this method, in the first investigation sweep a comparatively wide strip of the region of exploration along the profile of flight will be covered, corresponding approximately to the spacing of the two aircraft, whereas in the case of towing or flying the receiving devices behind the transmitting unit, a strip of the region of exploration will only be covered having a width of the order of magnitude of the cruising altitude, which, in its turn, is largely restricted.

Although the present invention has been described in conjunction with preferred embodiments, it is to be understood that modifications and variations may be resorted to without departing from the spirit and scope of the invention, as will be readily understood by those skilled in the art. Such modifications and variations are considered to be within the purview and scope of the appended claims.

We claim:

1. A method for detecting and exploring for mineral ores, subterranean metal bodies and geological formations comprising the steps of generating a rotary magnetic field, directing said field over an area while it is explored, traversing the area and there measuring the field for determination of anomalies therein.

2. The method according to claim 1 in which the measuring is simultaneously effected at two positions having a substantially fixed distance between them and the measurements are compared to detect anomalies.

3. The method according to claim 2 in which the voltage ratio of the two measurements is measured.

4. The method according to claim 2 in which the difference in phase angles of the two measurements is measured and utilizing said difference to determine the gradient of the phase shift over the space between the two measuring positions.

5. The method according to claim 1 in which said measurement is effected independently in two different planes at substantially right angles to each other and adjacent the intersection thereof, the added steps of comparing the phase angles between the voltage outputs from the two planes and measuring the intensity of voltage in at least one plane to determine the distance from the source of the rotary magnetic field.

6. The method according to claim 1 in which the rotary magnetic field is generated by a generating unit and the said traversing is done by a receiving unit, the further steps of arranging said units in tandem, maintaining a substantially fixed distance between said units and transporting the units along a profile of exploration.

7. The method according to claim 1 in which the rotary magnetic field is generated by a generating unit and the said traversing is done by a receiving unit, the further steps of arranging said units in lateral spacing, maintaining said spacing substantially fixed and transporting said units in parallel paths in side by side relation along a profile of exploration.

8. The method according to claim 1 in which the rotary magnetic field is generated by a generating unit capable of circular polarization about an axis and the said traversing is done by a receiving unit, the further steps of arranging said units so that the axis of the transmitting unit about which the magnetic rotary field is circularly polarized is maintained oriented toward the receiving unit.

9. The method of claim 1 in which the said measurement includes the rate of change of the measured quantity with time.

10. Apparatus for detecting and exploring for mineral ores, subterranean metal bodies and geological formations comprising a transmitting unit and a receiving unit, means in said transmitting unit to set up a rotary magnetic field along a predetermined axis, said receiving unit having at least one pair of substantially orthogonally arranged coils, and measuring means connected for comparing the outputs of said coils to thereby measure anomalies in the rotary magnetic field.

11. Apparatus according to claim 10 wherein the receiving unit is equipped with two pairs of substantially orthogonally arranged coils, each pair having measuring means for comparing the outputs of its coils, and measuring means for comparing the combined outputs of the coils of each pair whereby the receiver is operative without electrical connection to the transmitter.

12. Apparatus according to claim 10 wherein the transmitting unit comprises two similar coils mounted with their axes substantially at right angles to each other, an oscillation generator, phase adjusting means connecting said coils to said generator and adjusted to cause the currents in said coils to be substantially 90° out of phase with each other and means to adjust the product of ampere turns times area in said coils to be equal.

13. Apparatus according to claim 10 wherein the transmitting unit comprises two similar coils mounted with their axes substantially at right angles to each other, an oscillation generator, phase adjusting means connecting said coils to said generator and adjusted to cause the currents in said coils to be substantially 90° out of phase with each other and means to adjust the product of ampere turns times area in one of said coils to be twice that product for the other coil.

14. Apparatus for detecting and exploring for mineral ores, subterranean metal bodies and geological formations comprising a transmitting unit and a receiving unit, means in said transmitting unit to set up a rotary magnetic field along a predetermined axis, said receiving unit having at least one pair of substantially orthogonally arranged coils, phase shifting means for the voltages induced in said coils connected and adjusted to shift the voltage phases of the two coils for comparison thereof and means for effecting said comparison.

15. A method for detecting and exploring for mineral ores, subterranean metal bodies and geological formations, comprising the steps of generating an alternating magnetic field in a transmitting unit, directing said field over an area while it is explored, moving over said area at least two receiving units while maintaining them in fixed spaced relationship, electrically isolating the transmitting and the receiving units, and measuring the electrical outputs of said receiving units and from them determining the magnetic gradient of the space between the receiving units to detect anomalies set up in the said transmitted alternating magnetic field.

16. The method of claim 15 wherein said measuring is effected while moving the transmitting unit and the receiving units, maintaining said units in tandem interrelation, and maintaining a constant and different distance between each of the receiving units and the transmitting unit.

17. The method of claim 15 wherein said measuring is effected while moving the transmitting unit over said area in a path in one direction, simultaneously moving the receiving units over an adjacent and substantially parallel path, and maintaining the units in substantially aligned side by side relationship.

18. The method of claim 15 wherein the said measuring is of the phase difference of the voltages induced in two receiving devices.

19. The method of claim 15 wherein the measuring is of the differential of the voltages induced in two of said receiving units and includes the step of phase correction.

20. The method of claim 18 including the added step of measuring and recording the rate-of-change with time of the phase shift between the two voltages.

21. The method of claim 19 including the added step of measuring and recording the rate-of-change with time of said voltage.

22. The method of claim 15 including the step of measuring the amplitude of the voltage of one of the receiving units and using this voltage to determine the distance of the receiving unit from the transmitting unit.

References Cited in the file of this patent

UNITED STATES PATENTS

| | | |
|---|---|---|
| 1,812,392 | Zuschlag | June 30, 1931 |
| 1,890,786 | Johnston | Dec. 13, 1932 |
| 2,608,602 | Muffly | Aug. 26, 1952 |
| 2,642,477 | Puranen et al. | June 16, 1953 |

OTHER REFERENCES

"Geophysics," January, 1954, pp. 116–123.